United States Patent
Ishizuka et al.

(10) Patent No.: US 9,515,590 B2
(45) Date of Patent: Dec. 6, 2016

(54) MOTOR CONTROL DEVICE, IMAGE FORMING APPARATUS, MOTOR CONTROL METHOD, AND COMPUTER-READABLE STORAGE MEDIUM

(71) Applicants: Natsuko Ishizuka, Kanagawa (JP); Hiroyuki Kiguchi, Kanagawa (JP); Takeo Seki, Kanagawa (JP); Takuya Murata, Tokyo (JP)

(72) Inventors: Natsuko Ishizuka, Kanagawa (JP); Hiroyuki Kiguchi, Kanagawa (JP); Takeo Seki, Kanagawa (JP); Takuya Murata, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/599,700

(22) Filed: Jan. 19, 2015

(65) Prior Publication Data
US 2015/0130385 A1 May 14, 2015

Related U.S. Application Data

(63) Continuation of application No. 13/751,209, filed on Jan. 28, 2013, now Pat. No. 9,018,884.

(30) Foreign Application Priority Data

Feb. 6, 2012 (JP) .................................. 2012-022861
Jul. 3, 2012 (JP) .................................. 2012-149598
Jan. 16, 2013 (JP) .................................. 2013-005588

(51) Int. Cl.
*G05B 11/28* (2006.01)
*H02P 7/28* (2016.01)
*H02P 7/00* (2016.01)

(52) U.S. Cl.
CPC ............... *H02P 7/2805* (2013.01); *H02P 7/00* (2013.01)

(58) Field of Classification Search
CPC ..... H02P 27/08; H02M 7/53873; H02K 29/08
(Continued)

(56) References Cited

U.S. PATENT DOCUMENTS 3,951,251 A 4/1976 Zaccagnino, Jr.
6,064,165 A * 5/2000 Boisvert ................ B60J 7/0573
318/465

(Continued)

FOREIGN PATENT DOCUMENTS

CN 101618804 A 1/2010
CN 102070032 A 5/2011
(Continued)

OTHER PUBLICATIONS

Decision of a Patent Grant of Japanese Patent Application No. 2013-005588 dated Feb. 10, 2015.
(Continued)

*Primary Examiner* — Rina Duda
(74) *Attorney, Agent, or Firm* — Harness, Dickey & Pierce, P.L.C.

(57) ABSTRACT

A motor control device includes a controller configured to output a control signal to a motor driver, the control signal instructing the motor driver to cut off energization of a motor when the control signal and a signal changing depending on driving the motor do not change for a first time period, determine whether the motor is in a position hold state in which control for holding the motor at a position is executed, and change the control signal in a second time period shorter than the first time period when the motor is in the position hold state.

15 Claims, 7 Drawing Sheets

(58) Field of Classification Search
USPC ... 318/599, 811, 461, 685, 696, 602, 400.38
See application file for complete search history.

(56) References Cited

U.S. PATENT DOCUMENTS

| | | | |
|---|---|---|---|
| 6,316,892 B1* | 11/2001 | Valencia | E05F 15/632 |
| | | | 318/293 |
| 7,584,951 B2* | 9/2009 | Otani | B65H 9/008 |
| | | | 271/10.01 |
| 7,591,459 B2* | 9/2009 | Matsumoto | B65H 1/14 |
| | | | 271/97 |
| 7,848,687 B2 | 12/2010 | Iwasaki | |
| 7,891,657 B2 | 2/2011 | Fujita | |
| 7,942,409 B2 | 5/2011 | Ishikawa et al. | |
| 8,067,915 B2* | 11/2011 | Hooker | F25D 25/025 |
| | | | 312/319.8 |
| 8,084,967 B2 | 12/2011 | Tanaka | |
| 8,328,179 B2 | 12/2012 | Shimomura et al. | |
| 2002/0006304 A1* | 1/2002 | Naitou | B41J 11/706 |
| | | | 400/621 |
| 2004/0212338 A1 | 10/2004 | Shimizu et al. | |
| 2005/0169681 A1* | 8/2005 | Hata | G03G 15/602 |
| | | | 399/367 |
| 2007/0237530 A1* | 10/2007 | Sunada | G03G 15/6573 |
| | | | 399/21 |
| 2008/0122161 A1 | 5/2008 | Fujita | |
| 2009/0136243 A1 | 5/2009 | Tanaka | |
| 2009/0322470 A1* | 12/2009 | Yoo | A47B 88/0414 |
| | | | 340/3.1 |

FOREIGN PATENT DOCUMENTS

| | | |
|---|---|---|
| JP | 08-248738 A | 9/1996 |
| JP | 2002347296 A | 12/2002 |
| JP | 2004324105 A | 11/2004 |
| JP | 2008125154 A | 5/2008 |
| JP | 2009159717 A | 7/2009 |
| JP | 2011020187 A | 2/2011 |

OTHER PUBLICATIONS

Notice of Rejection of Japanese Patent Application No. 2013-005588 dated Dec. 24, 2014.

Chinese Office Action dated Jan. 12, 2015 for corresponding Chinese Application No. 201310129879.5.

* cited by examiner

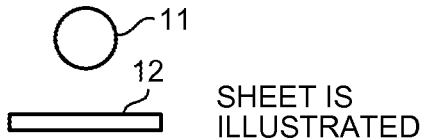

SHEET IS ILLUSTRATED (b) ORDINARY STOP STATE

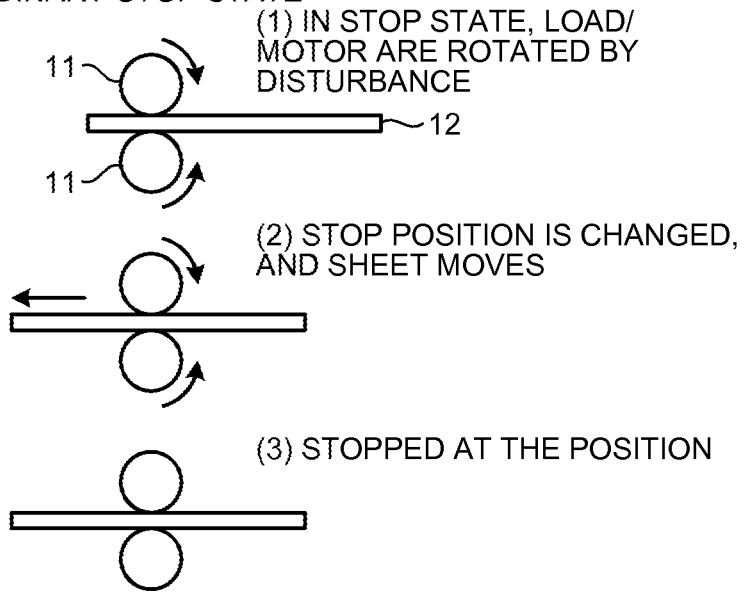

(1) IN STOP STATE, LOAD/MOTOR ARE ROTATED BY DISTURBANCE (2) STOP POSITION IS CHANGED, AND SHEET MOVES (3) STOPPED AT THE POSITION (c) POSITION HOLD STATE

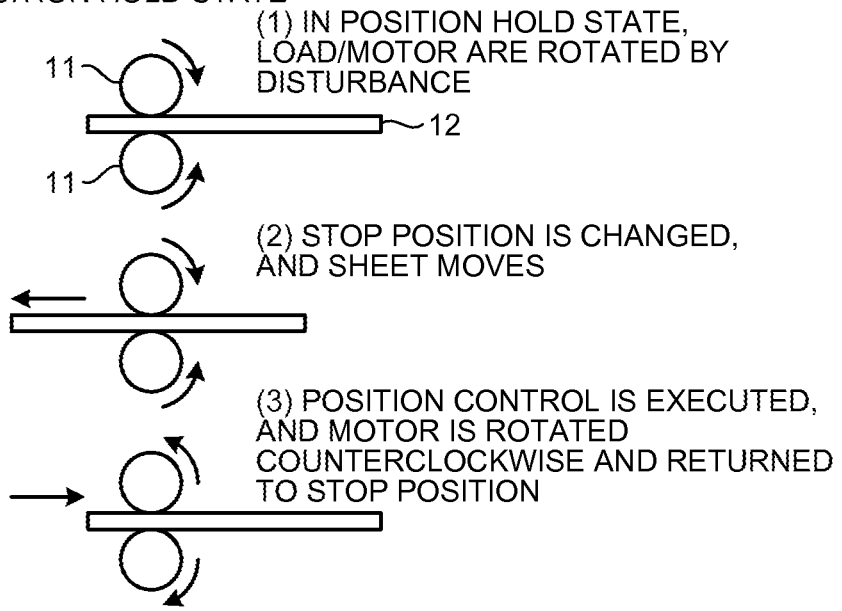

(1) IN POSITION HOLD STATE, LOAD/MOTOR ARE ROTATED BY DISTURBANCE (2) STOP POSITION IS CHANGED, AND SHEET MOVES (3) POSITION CONTROL IS EXECUTED, AND MOTOR IS ROTATED COUNTERCLOCKWISE AND RETURNED TO STOP POSITION

MOTOR CONTROL DEVICE, IMAGE FORMING APPARATUS, MOTOR CONTROL METHOD, AND COMPUTER-READABLE STORAGE MEDIUM

CROSS-REFERENCE TO RELATED APPLICATIONS

This application is a continuation of U.S. application Ser. No. 13/751,209, filed on Jan. 28, 2013, which claims priority to and incorporates by reference the entire contents of Japanese Patent Application No. 2012-022861 filed in Japan on Feb. 6, 2012, Japanese Patent Application No. 2012-149598 filed in Japan on Jul. 3, 2012, and Japanese Patent Application No. 2013-005588 filed in Japan on Jan. 16, 2013, the entire contents of each of which are hereby incorporated by reference.

BACKGROUND OF THE INVENTION

1. Field of the Invention

The invention relates to a motor control device, an image forming apparatus, a motor control method, and a computer-readable storage medium.

2. Description of the Related Art

As an image processing apparatus such as a printer, a facsimile, a scanner, a copier, and an MFP thereof, there is known an electrophotography image forming apparatus for forming an electrostatic latent image on a surface of a photosensitive drum that is an image carrier, making the electrostatic latent image on the photosensitive drum to a visible image by developing the electrostatic latent image with toner and the like that are a developer, transferring the developed image onto a recording sheet (also called a sheet, recording medium, and recording material) by a transfer device and causing the recording sheet to carry the image, and fixing a toner image on the recording sheet by a fixing device using pressure, heat, and the like.

Further, there is known a so-called inkjet image forming apparatus for forming an image by depositing ink as a liquid on a recording sheet while conveying the recording sheet using a device including a recording head composed of a liquid ejection head.

In the image forming apparatuses described above, it is known that a DC motor (direct current motor, hereinafter, also simply called a motor) is used as a drive unit of a sheet conveying unit and the sheet conveying unit is driven by executing feedback control by detecting the rotation speed of the DC motor so that the rotation speed becomes a set target speed.

Although a DC motor generally has small average power consumption as compared with a conventionally used stepping motor, it has a large maximum current. Accordingly, when some disadvantage and the like occur and a load becomes large, a current flowing to the DC motor increases and the DC motor generates excessive heat and a danger arises in that the DC motor is damaged depending on circumstances.

In particular, when the DC motor is applied with an excessive load and placed in a lock state (state that the DC motor cannot be rotated and is stopped), there is a possibility that a large amount of a current flows to a switching element such as a field-effect transistor (FET) and the like in a control circuit of the DC motor and the switching element is damaged.

To overcome the problem, there is proposed a technology for detecting a lock state from a pulse change amount of a signal from a Hall element (magnetic sensor) of a DC motor, and the like and cutting off the output of the DC motor and a technology for avoiding a lock state from being erroneously detected from a state of a DC motor or a load driven by the DC motor.

For example, Japanese Patent Application Laid-open No. 2002-347296 discloses a matter as to a DC motor used to drive an ink carrier of an inkjet printer. According to a technology of Japanese Patent Application Laid-open No. 2002-347296, first, each time the duty of a pulse signal is controlled at each predetermined time, whether or not the duty of the pulse signal becomes a maximum value is determined. The number of times the duty becomes the maximum value is counted by a counter and the number of times counted by the counter is increased until the counted value of the counter becomes a predetermined value without stopping the DC motor even if the duty has become the maximum value. Thereafter, when the count value of the counter has reached the predetermined value, it is determined that the DC motor is in the lock state (in which the DC motor cannot rotate and is stopped), and a voltage applied to the DC motor is interrupted.

Further, for example, Japanese Patent Application Laid-open No. 2004-324105 discloses to detect the engine stop of a vehicle and to change a determination threshold value used to determine whether or not a window glass is sandwiched when a battery voltage has reached a predetermined lower limit value (when a voltage stabilizing time has passed). From the technology, there is disclosed a device for avoiding an erroneous detection of lock of a DC motor for opening/closing a window glass.

In an image forming apparatus, it is necessary to place a DC motor in a state in which the DC motor is stopped while holding the rotation position of the motor to provide a sheet with a sag while the sheet being conveyed (hereinafter, called a position hold state) in addition to that the DC motor is subjected to a state of ordinary sheet conveying control (acceleration/constant speed/deceleration control) (hereinafter, called an ordinary rotation state).

However, the conventional technologies for avoiding the erroneous detection of lock have a problem described below. That is, the conventional technologies for avoiding the lock erroneous detection do not execute control by discriminating whether the DC motor is in an ordinary rotation state or in a position hold state. Accordingly, a problem arises in that when a motor is controlled to a position hold state, since it is erroneously detected that the motor is in a lock state and the output of the motor is cut off, the rotation position of the motor (that is, a sheet position) cannot be held.

Therefore, there is a need to avoid an erroneous detection of lock of a motor in a state that stop control is executed while holding the rotation position of the motor and to stop the motor while holding the motor position.

SUMMARY OF THE INVENTION

It is an object of the present invention to at least partially solve the problems in the conventional technology.

According to an embodiment, there is provided a motor control device that includes a motor lock state determining unit configured to determine whether a motor is in a lock state in which the motor cannot be rotated based on rotation information of the motor; a position hold state determining unit configured to determine whether the motor is in a position hold state in which the motor is stopped with a rotation position of the motor being held; a lock detection invalidation determining unit configured to invalidate the determination of the lock state of the motor executed by the motor lock state determining unit when it is determined by the position hold state determining unit that the motor is in the position hold state and when a predetermined condition is satisfied; a position error correction unit configured to correct an error of a target stop position of the motor so that the error falls within a predetermined range when the determination of the lock state of the motor is invalidated by the lock detection invalidation determining unit; and a motor control unit configured to perform control to change a rotation direction of the motor in a time shorter than a time in which the motor lock state determining unit determines that the motor is in the lock state when the motor is in the position hold state after the error is corrected.

According to another embodiment, there is provided an image forming apparatus that includes the motor control device according to the above embodiment; and the motor driven by the motor control device as a driving source to convey a sheet.

According to still another embodiment, there is provided a motor control method that includes determining whether a motor is in a lock state in which the motor cannot be rotated based on rotation information of the motor; determining whether the motor is in a position hold state in which the motor is stopped with a rotation position of the motor being held; invalidating the determination of the lock state of the motor when it is determined that the motor is in the position hold state and when a predetermined condition is satisfied; correcting an error of a target stop position of the motor so that the error falls within a predetermined range when the determination of the lock state of the motor is invalidated; and performing control to change a rotation direction of the motor in a time shorter than a time in which it is determined that the motor is in the lock state when the motor is in the position hold state after the error is corrected.

According to still another embodiment, there is provided a non-transitory computer-readable storage medium with an executable program stored thereon. The program instructs a computer to perform: determining whether a motor is in a lock state in which the motor cannot be rotated based on rotation information of the motor; determining whether the motor is in a position hold state in which the motor is stopped with a rotation position of the motor being held; invalidating the determination of the lock state of the motor when it is determined that the motor is in the position hold state and when a predetermined condition is satisfied; correcting an error of a target stop position of the motor so that the error falls within a predetermined range when the determination of the lock state of the motor is invalidated; and performing control to change a rotation direction of the motor in a time shorter than a time in which it is determined that the motor is in the lock state when the motor is in the position hold state after the error is corrected.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 illustrates a load and a sheet, an ordinary stop state of the motor, and a position hold state of the motor;

DETAILED DESCRIPTION OF THE PREFERRED EMBODIMENTS

Embodiments according to the invention will be explained below in detail referring to the accompanying drawings.

Configuration of Motor Control Device

Figure 1:
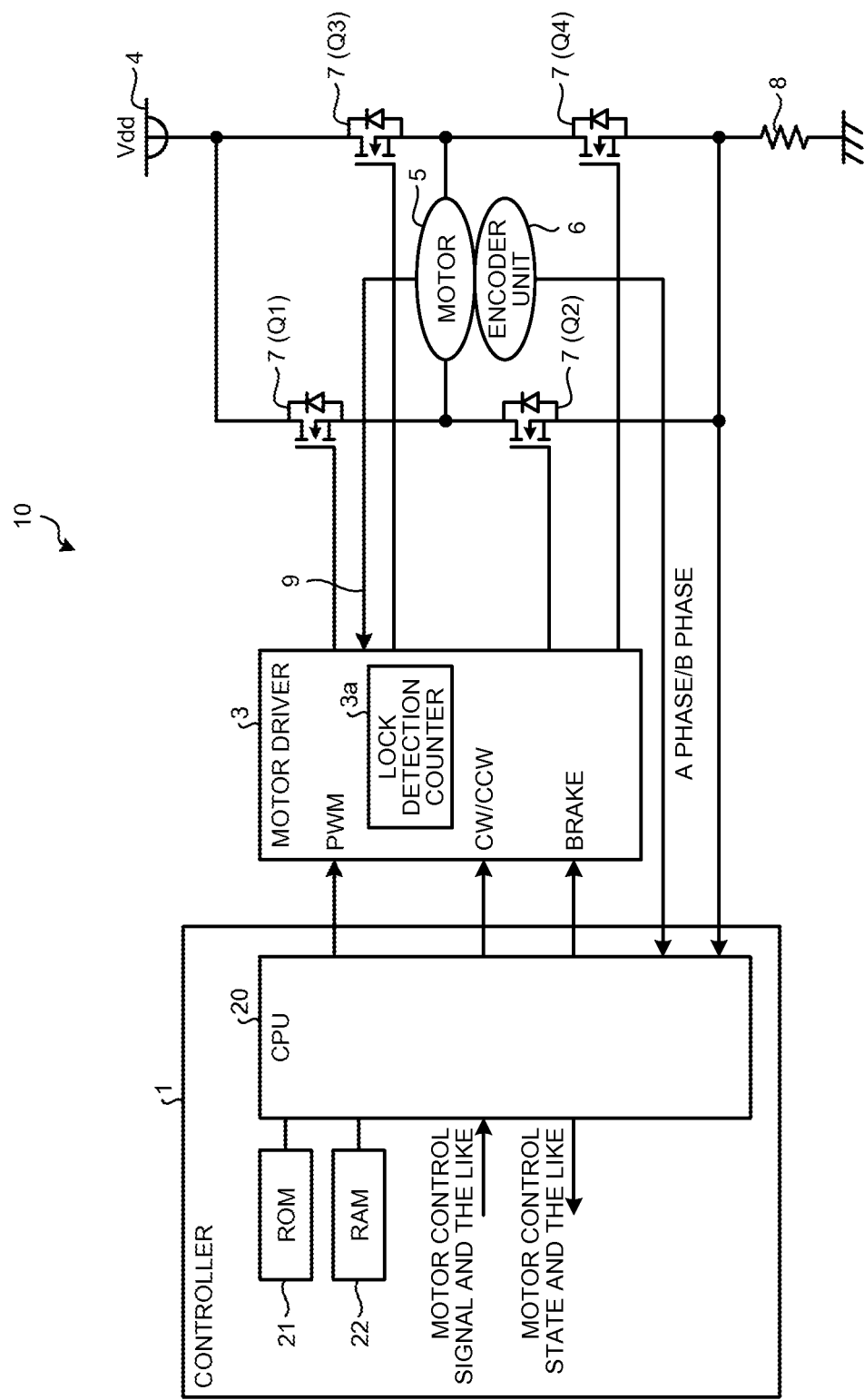
FIG. 1 is a circuit configuration view of a motor control device according to an embodiment.

FIG. 1 illustrates a circuit configuration view of a motor control device 10 according to an embodiment. As illustrated in FIG. 1, the motor control device 10 includes a controller 1 for controlling the motor control device 10 in its entirety, a CPU 20 for controlling a motor, a ROM 21, a RAM 22, a motor driver 3, an encoder unit 6, and the like. Note that the circuit configuration illustrated in FIG. 1 is an example and any configuration may be employed as long as the CPU 20 can feedback-control a DC motor 5 based on a motor control signal from the controller 1, an encoder signal sent from the encoder unit 6, and the like. Note that, hereinafter, the DC motor 5 will be simply described as the motor 5.

The controller 1 is configured to control the motor control device 10 in its entirety, and the CPU 20 having various functions as described later is configured as a part of the controller 1. The controller 1 can send a motor control signal (respective signals, for example, a target speed/position, a rotation direction, a start request, a stop request, and the like) to the CPU 20. Note that the motor control signal can execute a process as an electric signal or as software control such as a table and the like.

The CPU 20 executes the feedback control based on the motor control signal received from the controller 1 and the encoder signal sent from the encoder unit 6 so that the motor 5 is placed in the desired drive state. That is, the CPU 20 outputs a motor drive signal (PWM (pulse width modulation): PWM control signal, CW/CCW (clockwise/counter clockwise): rotation-direction signal, BRAKE: a brake signal, and the like) to the motor driver 3. Further, the CPU 20 returns various monitoring results, a control state, and the like of the motor 5 to the controller 1.

The motor driver 3 drives the motor 5 in rotation based on the motor control signals (PWM, CW/CCW, BRAKE) received from the CPU 20. For example, the motor driver 3 applies a voltage to the motor 5 based on a drive duty of the PWM signal. Further, when the motor 5 is a brushless motor, the motor driver 3 is input with a Hall element signal 9 and controls an ON/OFF timing of respective FETs 7. Note that the FET is an abbreviated name of field effect transistor.

Further, the motor driver 3 monitors various control signals and the Hall element signal 9 and clears an internal lock detection counter each time the Hall element signal 9 changes (to be described later). When a count of a lock detection counter 3a has reached a predetermined threshold value A, the motor driver 3 determines that a lock state has been achieved and energization of the motor 5 is cut off.

In the embodiment, the example in which the motor driver 3 determines the lock state based on the change of the Hall element signal 9, has been explained. In addition to the example, the CPU 20 may detect the lock state of the motor 5 based on a result of detection of the encoder sensor (encoder unit 6). Further, the determination based on the Hall element signal 9 may be executed by the CPU 20.

Figure 7:
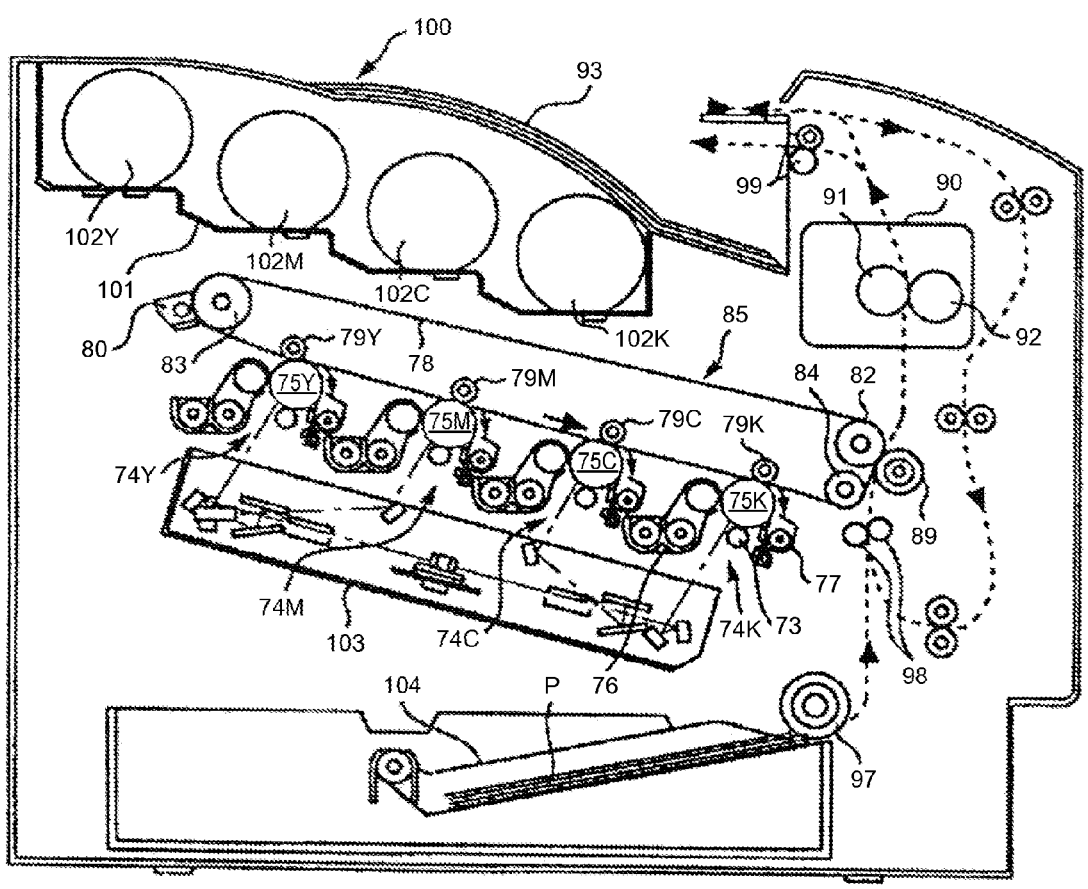
FIG. 7 is a sectional view illustrating an example of an image forming apparatus according to another embodiment.

The motor 5 is the DC motor and driven as a drive unit of a load 11 (refer to FIG. 2) such as a carriage roller and the like of an image forming apparatus (refer to FIG. 7). When the motor 5 is the brushless motor, the Hall element signal 9 is output from a Hall element of the motor 5 to the motor driver 3. Further, Vdd 4 denotes a drive voltage of the motor 5. Note that the motor 5 may be a brush motor. As generally known, the Hall element is a position detecting element for detecting the position (rotation angle) of a rotor of the motor 5.

The encoder unit (encoder sensor, rotary encoder) 6 is disposed on a rotating shaft of the motor 5 and detects the amount of rotation, the rotation speed, the rotation direction, and the like of the motor 5. A two-phase encoder signal (A phase/B phase) output from the encoder unit 6 is monitored by the CPU 20. Note that the encoder unit 6 may be configured so as to be disposed to the load 11 or to a unit that is operated in synchronization with the load 11 in place of being disposed on the rotating shaft of the motor 5.

Further, as a detection unit of the rotation speed of the motor 5, the Hall element signal 9 may be sent to the CPU 20 using the Hall element of the motor 5. In the case, a cost can be reduced in correspondence to that no sensor is mounted to detect the rotation speed of the motor 5.

The FETs 7 (Q1 to Q4) have an H-bridge circuit configuration for driving the motor 5. Note that, although the example of the two-phase is shown in the embodiment, the embodiment is not limited thereto and, in, for example, a case of a three-phase, a pair of upper and lower FETs is added in the configuration thereof.

Further, a motor control circuit is connected with a shunt resistor 8 so that a synthesized current flowing to the motor 5 can be monitored by the CPU 20.

Figure 2:
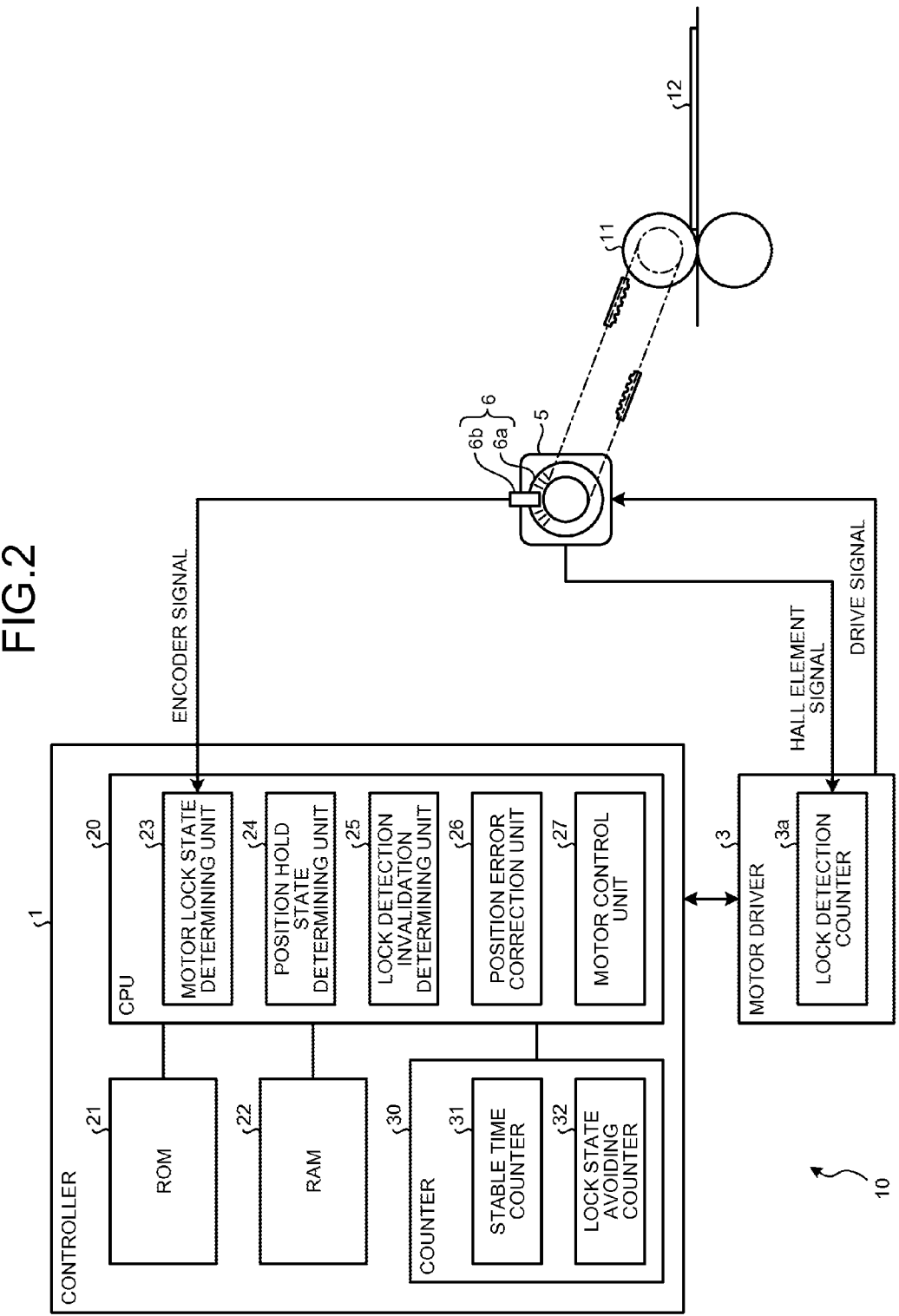
FIG. 2 is a block diagram illustrating a functional configuration of the motor control device according to the embodiment.

FIG. 2 is a block diagram illustrating a functional configuration of the motor control device according to the embodiment. The motor control device 10 controls the DC motor 5 as described later. The motor control device 10 has the controller 1 for controlling the motor control device 10 in its entirety. The controller 1 has a microcomputer system composed of the CPU 20 for executing control based on a control program, the ROM 21 in which the control program is stored, the RAM 22 used as a working memory, a counter 30, and the like.

The CPU 20 has the functions of a motor lock state determining unit 23, a position hold state determining unit 24, a lock detection invalidation determining unit 25, a position error correction unit 26, and a motor control unit 27.

The motor lock state determining unit 23 determines whether or not the motor 5 is in the lock state in which the motor 5 cannot rotate based on the rotation information of the motor. The position hold state determining unit 24 determines whether or not the motor 5 is in a position hold state in which the motor 5 is stopped with the rotation position being held. When the position hold state determining unit 24 determines that the motor 5 is in the position hold state and when a predetermined condition is satisfied (described later), the lock detection invalidation determining unit 25 invalidates the determination of the lock state of the motor 5 executed by the motor lock state determining unit 23. The position error correction unit 26 corrects an error to a target stop position of the motor 5 so that the error falls within a predetermined range when the lock detection invalidation determining unit 25 invalidates the lock state of the motor 5.

The motor control unit 27 executes control for changing the rotation direction of the motor 5 in a time shorter than a time in which the motor lock state determining unit 23 determines that the motor 5 is in the lock state when the determination executed by the position hold state determining unit 24 is the position hold state and after the error has been corrected.

Further, the motor control unit 27 inverts the output of the motor 5 with respect to a present rotation direction in a state that stop control is executed while holding the rotation position of the motor 5 after a predetermined time has passed after the correction of the error.

Further, the motor control unit sets a PWM value, which is applied to the motor 5 when the output of the motor 5 is inverted, to a value equal to or less than a PWM value that is planned to be output based on a drive duty by which the motor 5 is controlled.

Further, as the rotation information of the motor 5 used by the motor lock state determining unit 23, the output signal from the encoder unit 6 disposed to the motor 5 is used. Further, the rotation information of the motor 5 used by the motor lock state determining unit 23 can be also realized by using the Hall element signal 9 in the motor 5.

Further, the motor control unit 27 determines the completion of correction of the error executed by the position error correction unit 26 depending on whether or not a state that the error is equal to or more than a predetermined value continues for a predetermined time or more. Further, the motor control unit 27 determines the completion of correction of the error executed by the position error correction unit 26 depending on whether or not the error becomes 0.

Further, the motor control unit 27 changes the control state to the state that the stop control is executed while holding a rotation stop position of the motor 5 based on the target speed of the motor 5, whether or not the target position changes, or the internal state of the motor control unit 27.

The motor driver 3 drives the motor 5 in response to the instruction from the controller 1 (CPU 20). The motor driver 3 has the lock detection counter 3a. The counter 30 has a stable time counter 31 and a lock state avoiding counter 32. The functions of the counters will be explained by a flowchart of FIG. 6 to be described later.

The encoder unit 6 is disposed coaxially to a main shaft of the motor 5 or to the load 11. The encoder unit 6 is composed of, for example, an encoder disc 6a having minute slits disposed at equal intervals and an encoder sensor 6b having a light emitting/receiving unit and installed across the slits of the encoder disc 6a. When the encoder disc 6a disposed to the main shaft of the motor 5 is rotated, the encoder sensor 6b optically reads the slits being rotated and outputs the read slits as an electric signal. Note that the configuration of the encoder unit 6 is an example and other configuration may be employed as long as the configuration can detect the rotation angle of the motor 5. For example, the encoder unit 6 may be configured by using a reflection member to the encoder disc 6a in place of the slits and causing the encoder sensor 6b to receive the light reflected from the reflection member.

As illustrated in, for example, FIG. 2, the motor 5 and the load 11 such as the carriage roller and the like have such a mechanism that a drive is transmitted from the motor 5 to the load 11 via a timing belt trained around a timing pulley disposed to an output shaft of the motor 5 and a timing pulley disposed to a shaft of the load 11. Motor stop state Next, the stop state of the motor 5 will be explained. In FIG. 3, (a) illustrates the load 11 (carriage roller, and the like) driven by the motor 5 and a sheet 12. Further, (b) of FIG. 3 illustrates an ordinary stop state, and (c) of FIG. 3 illustrates the position hold state.

As described above, in the image forming apparatus, to provide the sheet 12 with a sag while the sheet 12 is being conveyed, it is necessary to stop the motor while hold controlling a motor position (position hold state) which is discriminated from the ordinary stop state.

In the ordinary stop state illustrated in (b) of FIG. 3, no PWM signal is output from the motor control unit 27 to the motor driver 3 and the motor 5 is in a non-control state. Accordingly, in the ordinary stop state, (1) a disturbance (torque variation, and the like of the load) is applied to the motor 5, (2) the stop position of the motor 5 is changed and the sheet 12 is moved, and (3) even if the motor 5 stops, the positions of the motor 5 and the sheet 12 are not held. As described above, in the ordinary stop state, the positions of the motor 5 and the sheet 12 are not held. Note that a brake stop state may be achieved by validating a BRAKE signal in place of cutting off the output of the PWM signal.

In contrast, in the position hold state illustrated in (c) of FIG. 3, the PWM signal is output from the CPU 20 to the motor driver 3 and the motor 5 is placed in the control state. Accordingly, in the position hold state, (1) a disturbance is applied to the motor 5 and (2) even if the stop position is changed and the sheet 12 is moved, (3) the position control is executed and control for returning the motor 5 to the stop position is executed by rotating the motor reversely. In the position hold state, the positions of the motor 5 and the sheet 12 are finally held.

Detection of Motor State

Next, a case that the lock state is erroneously detected in the position hold state will be explained. Note that, in the embodiment, a case that the motor driver 3 detects the lock state based on a change of the Hall element signal 9 from the Hall element of the motor 5 will be explained as an example.

As described above, the motor driver 3 monitors the various control signals and the Hall element signal 9, and each time the Hall element signal 9 changes, the motor driver 3 clears the lock detection counter 3a. Further, the motor driver 3 clears the lock detection counter 3a also when the various control signals change.

When the count of the lock detection counter 3a has reached a predetermined threshold value A, since it can be said that the various control signals and the Hall element signal 9 do not change for a predetermined time, it is determined that the motor 5 is in the lock state and the energization of the motor 5 is cut off.

Here, in the position hold state ((c) of FIG. 3) described above, when no disturbance is applied and the motor 5 is in the stop state, since the Hall element signal 9 of the motor 5 does not change, the lock detection counter 3a is not cleared and the count reaches the threshold value A, thereby there may occur a case that the position hold state is erroneously detected as the lock state.

Lock Detection Invalidation Control

To cope with the problem, the motor control device 10 according to the embodiment has the motor lock state determining unit 23 for detecting that the motor 5 is in the lock state in which it is locked. Further, the motor control device 10 has the position error correction unit 26 for correcting a stop position error when the motor 5 stops. Further, the motor control device 10 includes the motor control unit 27 for changing a motor output in a state that the stop control is executed while holding the motor position when the predetermined time (lock state avoiding time, a threshold value D) has passed after the correction of the stop position error. The predetermined time is set to a time shorter than a time during which the motor control unit 27 determines that the motor 5 is in the lock state (a lock detection time, the threshold value A) based on a result of detection from the motor lock state determining unit 23. A specific control example will be explained below.

The motor lock state determining unit 23 determines the lock state of the motor by a detection unit composed by combining the Hall element of the motor 5 or the encoder unit 6 with the motor driver 3 or the controller 1 based on the respective signals thereof.

Figure 4:
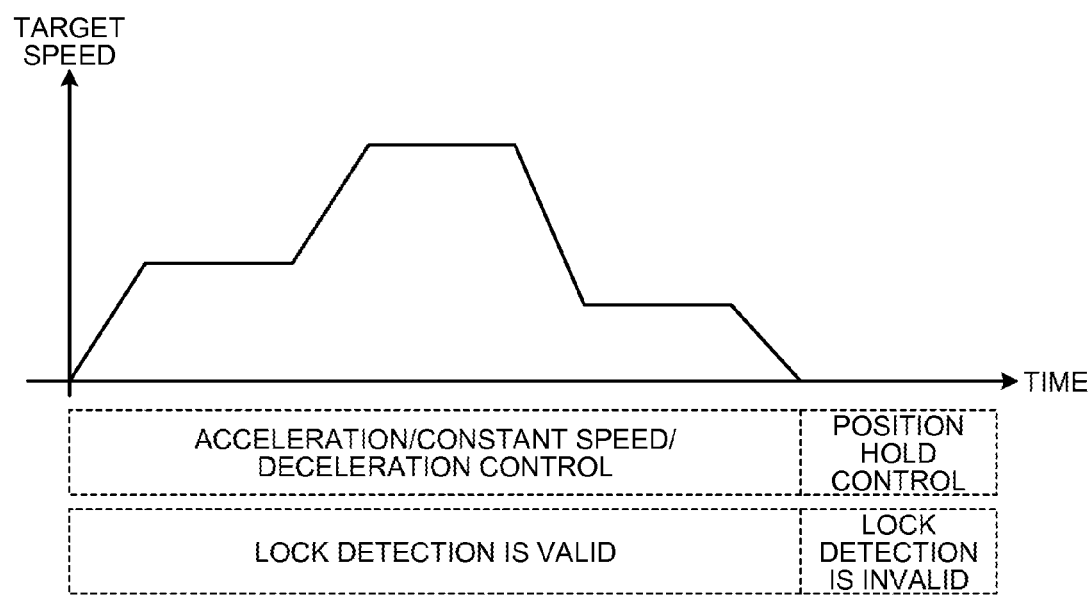
FIG. 4 is an explanatory view of a graph illustrating the relation between a time and a target speed to which the relation between a motor control state and a lock detection valid/invalid state is applied.

FIG. 4 illustrates an explanatory view of a graph illustrating the relation between a time and a target speed to which the relation between a control state of the motor 5 and a lock detection valid/invalid state is applied. In the embodiment, as illustrated in FIG. 4, when the motor 5 that executes ordinary sheet conveying control is ordinarily rotated (acceleration/constant speed/deceleration control), the lock detection is in the valid state and a damage due to overload, and the like is prevented. In contrast, in the position hold state, the erroneous detection is prevented by preventing the lock state from being detected, thereby it is made possible to stop the motor 5 while holding the motor position as described later.

Note that, although the following cases are exemplified as a trigger (a predetermined condition) for the motor control device 10 to change the lock detection from the valid state to the invalid state, any of the means may be employed.

(1) When the target speed reaches 0 in the CPU 20 (lock detection invalidation determining unit 25)

(2) When the target position becomes not to change in the CPU 20 (lock detection invalidation determining unit 25)

(3) When an internal state becomes a position hold in the CPU 20 (lock detection invalidation determining unit 25)

(4) When the internal state becomes a stop position correction in the CPU 20 (lock detection invalidation determining unit 25)

(5) When a motor control signal is not input to the CPU 20 (lock detection invalidation determining unit 25) (when a table is used as the control signal)

Figure 5:
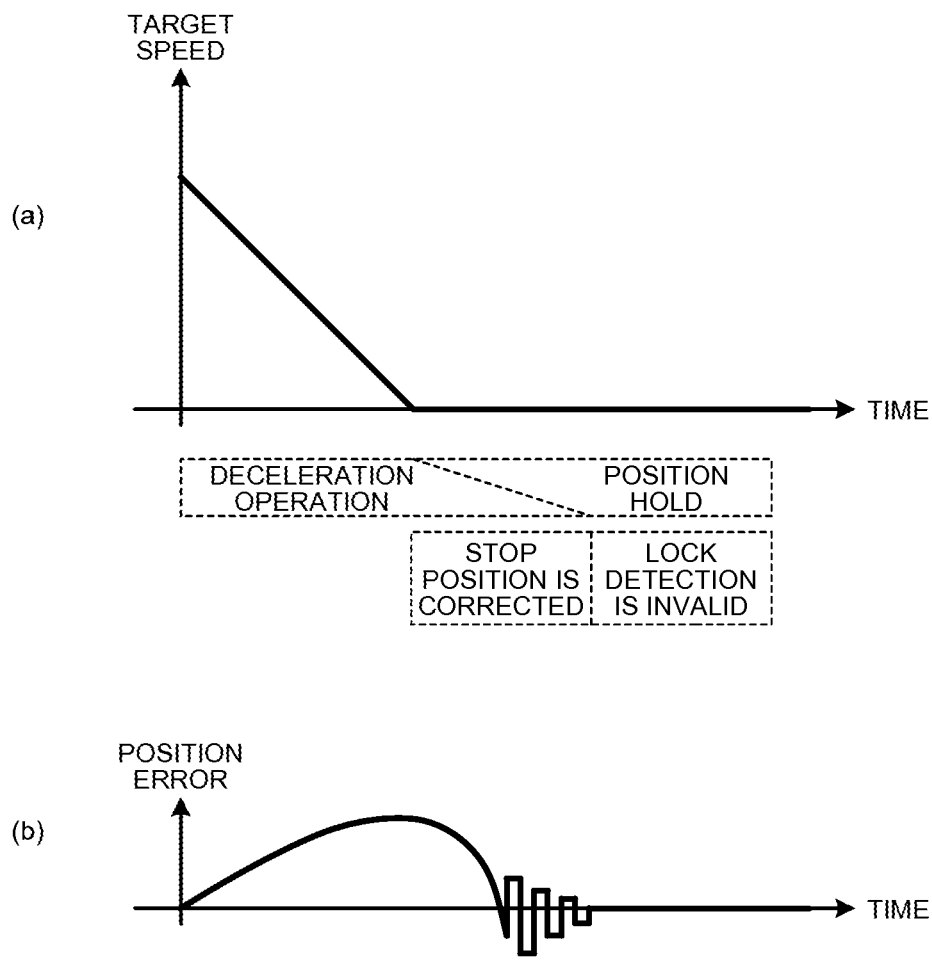
FIG. 5 illustrates the relation between a time at which a motor is stopped from deceleration control and a target speed to which the relation between the motor control state and a motor stop position correction/lock detection valid/invalid state is applied, and the relation between a time and a position error.

In FIG. 5, (a) illustrates the relation between the control state of the motor 5 and the stop position correction/the lock detection invalid state of the motor 5 in a graph illustrating the relation between a time when the motor 5 is stopped from the deceleration control and the target speed. In FIG. 5, (b) illustrates a graph illustrating the relation between the time and the position error (a change of the position error to the target speed). Position error correction control when the motor 5 stops will be explained referring to FIG. 5.

When a sheet is conveyed in the image forming apparatus (refer to FIG. 7), although a stop position of the sheet becomes important, a target stop position may fail to be reached at the time a deceleration operation at given deceleration has been finished depending on a speed at the time of deceleration of the motor 5, the state of the load 11, and the like.

Accordingly, the CPU 20 (position error correction unit 26) executes the position error correction control of the motor stop position. As illustrated in (b) of FIG. 5, the position error correction control is executed by repeatedly rotating the motor 5 clockwise and counterclockwise. Further, when the position error has fallen within a predetermined range, the position error correction control is finished, and control goes to the lock detection invalidation control. Note that, even when the position error occurs by a disturbance in the position hold state illustrated in (c) of FIG. 3, the position error correction control is executed likewise.

In the position error correction control of the motor stop position, when the lock detection is avoided by inverting the output of the motor 5, vibration is increased and a time until the stop position is stabilized is increased (time until the position error correction is finished). Accordingly, this is not preferable because there is a possibility that an influence by which a process performance is deteriorated occurs.

Thus, in the embodiment, the output of the motor 5 is inverted after the position error correction control has been finished by the position error correction unit 26 in a lock invalidation period by the lock detection invalidation determining unit 25 and the motor control unit 27 has stabilized the position at which the rotation of the motor 5 is stopped.

The lock detection invalidation process explained above and executed by the motor control device 10 will be explained referring to a flowchart of FIG. 6. Note that although it is assumed that the lock detection invalidation process is executed, for example, once per 1 msec by the lock detection invalidation determining unit 25, the intervals of the process are not limited thereto.

First, the lock detection invalidation determining unit 25 determines whether or not it is the lock detection invalidation period (step S1). Here, as illustrated in FIG. 4, when it is a lock detection valid period (step S1: No), since it is the time at which the motor 5 that executes the ordinary sheet conveying control is ordinarily rotated, the lock detection invalidation process is finished. In contrast, when it is the lock detection invalidation period (step S1: Yes), next, it is confirmed that whether or not the position error correction control ((b) of FIG. 5) has been finished and the position error has been stabilized.

Here, the lock detection invalidation determining unit 25 determines whether or not the position error is equal to or less than a predetermined threshold value B (step S2). When the position error exceeds the threshold value B (step S2: No), since it can be determined that the position error correction control is being executed, the stable time counter 31 during a time in which the position error has been stabilized (stable time) is cleared (step S4), and the lock detection invalidation process executed by the lock detection invalidation determining unit 25 is finished.

In contrast, when the lock detection invalidation determining unit 25 determines that the position error is equal to or less than the threshold value (step S2: Yes), since it can be determined that the correction control of the position error has been finished, a time in which the position error is stabilized is measured. Specifically, the stable time counter 31 is incremented (step S3). With the operation, the stable time after the correction control of the position error is measured.

Next, it is determined whether or not the count of the stable time counter 31 (the stable time in which the position error is stabilized) is equal to or more than a threshold value C (step S5). When the stable time in which the position error is stabilized is less than the threshold value C (step S5: No), the lock detection invalidation process is finished. In contrast, when the stable time in which the position error is stabilized is equal to or more than the threshold value (step S5: Yes), since it can be determined that the position error is stabilized for the predetermined time or more after the correction control of the position error, the process goes to avoidance of the lock state.

When the lock state is avoided, first, the lock state avoiding counter 32 is counted up (step S6). Next, it is determined whether or not the count of the lock state avoiding counter 32 (the lock state avoiding time) becomes equal to or more than the threshold value D (step S7). Here, the threshold value D is set to a time shorter than the lock state avoiding counter (threshold value A) to avoid the lock detection.

In the determination of the lock detection invalidation determining unit 25, when the lock state avoiding time is less than the threshold value D (step S7: No), the lock detection invalidation process is finished. In contrast, in the determination of the lock detection invalidation determining unit 25, when the lock state avoiding time is equal to or more than the threshold value (step S7: Yes), first, the lock state avoiding counter 32 is cleared to avoid detection in a next process (step S8). Note that the lock state avoiding counter 32 may be cleared (step S8) after the control for inverting the output of the motor 5 (step S9).

Next, the motor control unit 27 of the CPU 20 executes the motor output inversion control. As a signal for inverting the output of the motor 5, there is, for example, a brake signal, an enable signal, a rotation direction signal, and the like. That is, the lock detection counter 3a of the motor driver 3 is cleared by changing the control signal that is referred to by the motor lock state determining unit 23.

Further, in the inversion control of the output of the motor 5 (step S9), it is preferable to set the PWM value, which is applied to the motor 5 based on the drive duty of the PWM signal, to a value smaller than the PWM value planned to be output. For example, when a control voltage value (PWM value planned to be output) calculated as a value to be output at a corresponding period is denoted by Cd and a control voltage value to be output in the inversion control is denoted by Cr, it is preferable that the control voltage value Cr satisfy Cr≤Cd. This is because that since the control voltage value Cr made nearer to 0 can make force that tends to move in a reverse rotation direction smaller, a minute amount of vibration of the motor 5 can be suppressed.

As described above, in the motor control device 10 according to the embodiment, the control signal and the like which the motor lock state determining unit 23 refers to is changed in a period shorter than the time in which the lock state is detected. The lock detection counter 3a is cleared by the control, thereby the erroneous detection of the lock of the motor 5 in the position hold state can be avoided.

Figure 6:
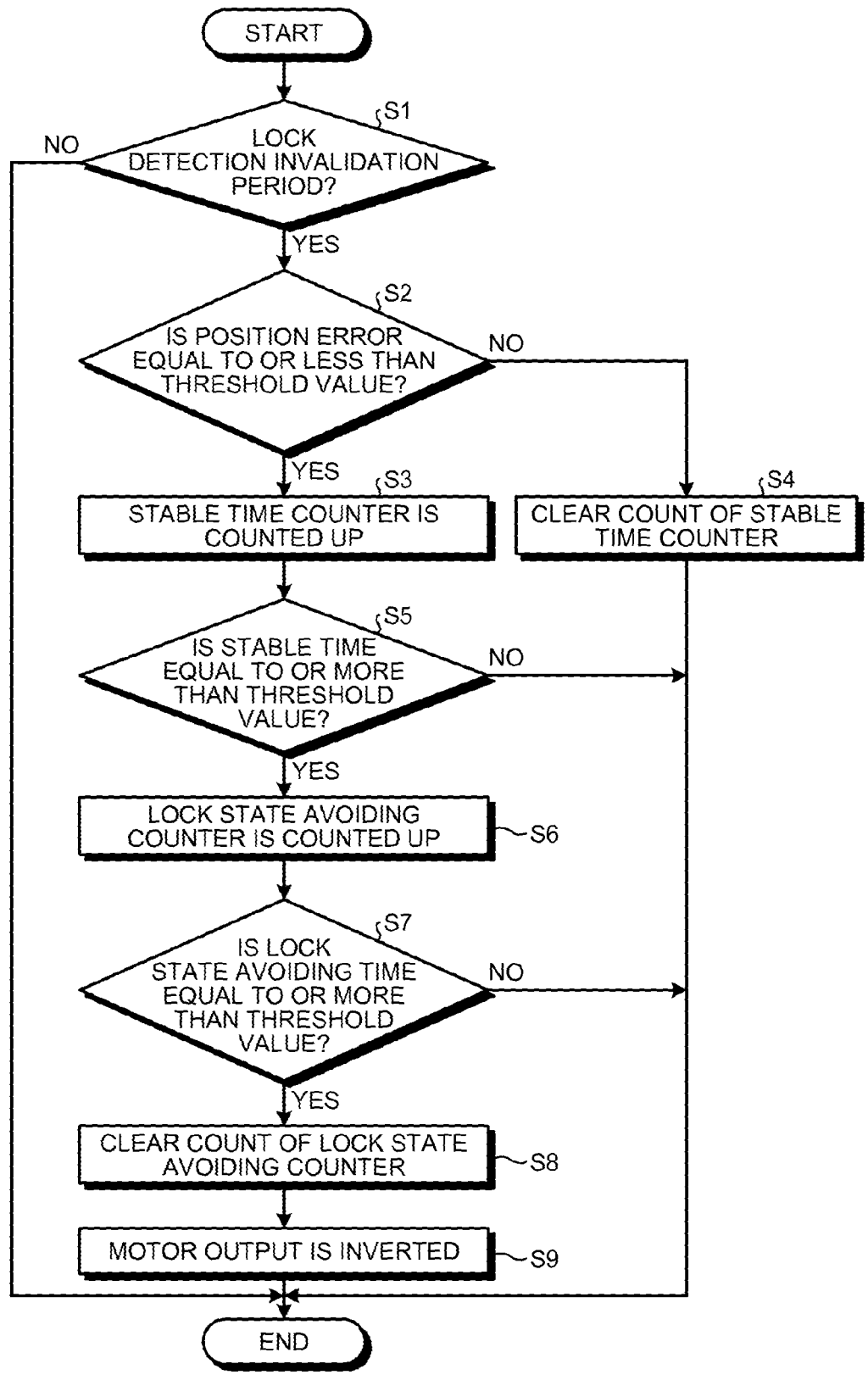
FIG. 6 is a flowchart illustrating a lock detection invalidation process in the position hold state.

Note that the process illustrated in FIG. 6 is an example and is not limited thereto. For example, the threshold value B of the position error that is determined at step S2 may be set to "0" in place of the process as to the stable time (steps S3 to S5), and a process for shifting to the avoidance of the lock state (step S6 and thereafter) may be executed when the position error becomes "0".

Image Forming Apparatus

An example of an image forming apparatus including the DC motor 5, which is controlled by the motor control device 10 explained above, as a driving source will be explained.

FIG. 7 is an overall configuration view illustrating an embodiment of the image forming apparatus according to the invention. As illustrated in FIG. 7, an image forming apparatus 100 is a tandem color printer. A bottle accommodation unit 101 disposed in an upper portion of a main body of the image forming apparatus 100 is detachably (exchangeably) installed with four toner bottles 102Y, 102M, 102C, 102K corresponding to respective colors (yellow, magenta, cyan, black).

An intermediate transfer unit 85 is disposed below the bottle accommodation unit 101. Image forming units 74Y, 74M, 74C, 74K corresponding to the respective colors (yellow, magenta, cyan, black) are disposed side by side so as to confront an intermediate transfer belt 78 of the intermediate transfer unit 85.

The respective image forming units 74Y, 74M, 74C, 74K are disposed with photosensitive drums 75Y, 75M, 75C, 75K, respectively. Further, a charging unit 73, a developing unit 76, a cleaning unit 77, a neutralization unit (not illustrated), and the like are disposed in the periphery of each of the photosensitive drums 75Y, 75M, 75C, 75K. Then, an image forming process (a charging process, exposure process, development process, transfer process, and cleaning process) is executed in each of the photosensitive drums 75Y, 75M, 75C, 75K and images of respective colors are formed on the respective photosensitive drums 75Y, 75M, 75C, 75K.

The photosensitive drums 75Y, 75M, 75C, 75K are driven in rotation by a not illustrated drive motor clockwise in FIG. 6. Then, surfaces of the photosensitive drums 75Y, 75M, 75C, 75K are electrostatically charged uniformly at the position of the charging unit 73 (charge step).

Thereafter, the surfaces of the photosensitive drums 75Y, 75M, 75C, 75K reach a radiation position to which a laser beam emitted from an exposure unit 103 is radiated, and electrostatic latent images corresponding to the respective colors are formed by exposing and scanning the surfaces at the position (exposure step).

Thereafter, the surfaces of the photosensitive drums 75Y, 75M, 75C, 75K reach the positions confronting the developing units 76, the electrostatic latent images are developed at the positions, and toner images of the respective colors are formed (development step).

Thereafter, the surfaces of the photosensitive drums 75Y, 75M, 75C, 75K reach the positions confronting the intermediate transfer belt 78 and primary transfer bias rollers 79Y, 79M, 79C, 79K. At the positions, the toner images on the photosensitive drums 75Y, 75M, 75C, 75K are transferred onto the intermediate transfer belt 78 (primary transfer step). At the time, non-transferred toners remain on the photosensitive drums 75Y, 75M, 75C, 75K even in a slight amount.

Thereafter, the surfaces of the photosensitive drums 75Y, 75M, 75C, 75K reach a position confronting the cleaning unit 77. At the position, the non-transferred toners remaining on the photosensitive drums 75Y, 75M, 75C, 75K are mechanically collected by a cleaning blade of the cleaning unit 77 (cleaning step).

Finally, the surfaces of the photosensitive drums 75Y, 75M, 75C, 75K reach a position confronting the not illustrated neutralization unit and a potential remaining on the photosensitive drums 75Y, 75M, 75C, 75K is removed at the position. With the operation, a series of the image forming processes executed on the photosensitive drums 75Y, 75M, 75C, 75K is finished.

Thereafter, the toner images of the respective colors formed on the respective photosensitive drums are transferred onto the intermediate transfer belt 78 in an overlapping fashion via the development step. With the operation, a color image is formed on the intermediate transfer belt 78.

Here, the intermediate transfer unit 85 is configured as described below. That is, the intermediate transfer unit 85 is composed of the intermediate transfer belt 78, the four primary transfer bias rollers 79Y, 79M, 79C, 79K, a secondary transfer backup roller 82, a cleaning backup roller 83, a tension roller 84, an intermediate transfer cleaning unit 80, and the like. The intermediate transfer belt 78 is stretched and supported by the three rollers 82 to 84 and endlessly moved in an arrow direction in FIG. 7 by the secondary transfer backup roller 82 driven in rotation.

The four primary transfer bias rollers 79Y, 79M, 79C, 79K form primary transfer nips by sandwiching the intermediate transfer belt 78 between them and the photosensitive drums 75Y, 75M, 75C, 75K, respectively. Then, a transfer bias having a polarity opposite to that of toner is applied to the primary transfer bias rollers 79Y, 79M, 79C, 79K.

Then, the intermediate transfer belt 78 travels in the arrow direction and sequentially passes through the primary transfer nips of the respective primary transfer bias rollers 79Y, 79M, 79C, 79K. With the operation, the toner images of the respective colors on the photosensitive drums 75Y, 75M, 75C, 75K are primarily transferred onto the intermediate transfer belt 78 in an overlapping fashion.

Thereafter, the intermediate transfer belt 78 onto which the toner images of the respective colors are transferred in the overlapping fashion reaches a position confronting a secondary transfer roller 89. At the position, the secondary transfer backup roller 82 forms a secondary transfer nip by sandwiching the intermediate transfer belt 78 between it and the secondary transfer roller 89. Then, the four-color toner image formed on the intermediate transfer belt 78 is transferred onto the recording medium P conveyed to the position of the secondary transfer nip. At the time, a non-transferred toner that is not transferred onto the recording medium P remains on the intermediate transfer belt 78.

Thereafter, the intermediate transfer belt 78 reaches the position of the intermediate transfer cleaning unit 80. At the position, the non-transfer toner on the intermediate transfer belt 78 is collected. With the operation, a series of the transfer processes executed on the intermediate transfer belt 78 is finished.

Here, the recording medium P conveyed to the position of the secondary transfer nip has been conveyed from a paper feeding unit 104 disposed to a lower portion of the image forming apparatus 100 via a sheet feed roller 97, a pair of registration rollers 98, and the like.

For details, plural recording mediums P such as transfer sheets are accommodated in the paper feeding unit 104 by being overlapped. Then, when the sheet feed roller 97 is driven in rotation counterclockwise in FIG. 7, an uppermost recording medium P is fed toward between the pair of registration rollers 98.

The recording medium P having been conveyed to the pair of registration rollers 98 stops once at the position of a roller nip of the pair of registration rollers 98 whose drive in rotation has been stopped. Then, the pair of registration rollers 98 is driven in rotation at a timing of the color image on the intermediate transfer belt 78 and the recording medium P is conveyed toward the secondary transfer nip. With the operation, a desired color image is transferred onto the recording medium P.

Thereafter, the recording medium P to which the color image has been transferred at the position of the secondary transfer nip is conveyed to the position of a fixing device 90. Then, at the position, the color image, which has been transferred onto a surface of the recording medium P, is fixed onto the recording medium P by heat and pressure applied by a fixing roller 91 and a pressing roller 92.

Thereafter, the recording medium P is discharged to the outside of the apparatus passing between rollers of a pair of ejecting rollers 99. Recording mediums P onto which an image has been transferred and which have been discharged to the outside of the apparatus by the pair of ejecting rollers 99 are sequentially stacked on a stack unit 93 as output images. With the operation, the series of the image forming processes in the image forming apparatus is completed.

The motor 5 is used as the driving source of the load 11 such as the respective rollers of the image forming apparatus 100 explained above, and the motor 5 is controlled by the motor control device 10 according to the embodiment. With the configuration, it becomes possible to configure the image forming apparatus 100 that has an improved abnormality detection accuracy of the motor 5 while it is being controlled.

Although it is assumed that a program executed in the embodiment is provided by being previously assembled to the ROM 21, the program is not limited thereto. The program executed in the embodiment may be provided as a computer program product by being recorded to a computer-readable storage medium. The program may be provided by being recorded to a computer-readable storage, for example, a CD-ROM, a flexible disc (FD), a CD-R, a DVD (Digital Versatile Disk), and the like using an installable file or an executable file.

Further, the program executed in the embodiment may be configured so as to be provided by being stored on a computer connected to a network such as the Internet and downloaded via the network. Further, the program executed in the embodiment may be provided or distributed via a network such as the Internet.

The program executed in the embodiment is configured as a module including the motor lock state determining unit 23, the position hold state determining unit 24, the lock detection invalidation determining unit 25, the position error correction unit 26, and the motor control unit 27 described above. As actual hardware, the respective units are loaded on a main storage device such as the RAM 22 by that the CPU 20 (processor) reads the program from the storage medium and executes the program. Then, the motor lock state determining unit 23, the position hold state determining unit 24, the lock detection invalidation determining unit 25, the position error correction unit 26, and the motor control unit 27 are created on the main storage device.

According to the embodiments, there is achieved an effect that an erroneous detection of lock of a motor in a state that stop control is executed while holding a motor position (a position hold state) is avoided and the motor can be stopped while holding the motor position.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor control device comprising:
a controller configured to,
output a control signal to a motor driver, the control signal instructing the motor driver to cut off energization of a motor when the control signal and a signal changing depending on driving the motor do not change for a first time period,
determine whether the motor is in a position hold state in which the controller executes position control to instruct the motor driver to maintain the motor at a position by driving the motor back to the position when the position is changed, and
change the control signal in a second time period shorter than the first time period when the motor is in the position hold state such that, when the motor is in the position hold state, the controller changes the control signal to drive the motor differently prior to the controller instructing the motor driver to cut off the energization of the motor.

2. The motor control device according to claim 1, wherein the controller is further configured to output, to the motor driver during the position hold state, a motor drive signal for driving the motor.

3. The motor control device according to claim 1, wherein the control signal is a rotation direction signal indicating a direction of rotation of the motor.

4. The motor control device according to claim 1, wherein the control signal is a brake signal.

5. The motor control device according to claim 3, wherein changes in the rotation direction signal indicates changes in the direction of rotation of the motor.

6. The motor control device according to claim 2, wherein the motor drive signal is a pulse width modulation signal.

7. The motor control device of claim 1, wherein the controller is configured to change the control signal such that the energization to the motor is not cut off when the motor is in the position hold state.

8. A motor system comprising:
a motor; and
a motor driver configured to apply a voltage to the motor based on a control signal; and
a motor control device including a controller configured to
output the control signal to the motor driver, the control signal instructing the motor driver to cut off energization of the motor when the control signal and a signal changing depending on driving the motor do not change for a first time period,
determine whether the motor is in a position hold state in which the controller executes position control to instruct the driver to maintain the motor at a position by driving the motor back to the position when the position is changed, and
change the control signal in a second time period shorter than the first time period when the motor is in the position hold state such that, when the motor is in the position hold state, the controller changes the control signal to drive the motor differently prior to the controller instructing the motor driver to cut off the energization of the motor.

9. The motor system according to claim 8, wherein the motor includes a Hall element, and
the signal changing depending on driving the motor includes at least a Hall element signal output from the Hall element.

10. The motor system according to claim 8, further comprising:
an encoder disc that is disposed coaxially to a main shaft of the motor or to a load.

11. The motor system according to claim 10, wherein the signal changing depending on driving the motor includes at least an encoder signal output depending on rotation of the encoder disc.

12. A conveying device comprising:
at least one roller; and
the motor system according to claim 8.

13. An image forming apparatus comprising:
at least one roller;
an image forming device configured to perform an image forming process to form an image on a recording medium; and
the motor system according to claim 8.

14. A motor control method comprising:
outputting a control signal to a motor driver, the control signal instructing the motor driver to cut off energization of a motor when the control signal and a signal changing depending on driving the motor do not change for a first time period;
determining whether the motor is in a position hold state in which the controller executes position control to instruct the motor driver to maintain the motor at a position by driving the motor back to the position when the position is changed; and
changing the control signal in a second time period shorter than the first time period when the motor is in the position such that, when the motor is in the position hold state, the changing changes the control signal to drive the motor differently prior to the outputting outputting the control signal to instruct the motor driver to cut off the energization of the motor.

15. The motor control method of claim 14, wherein the controller is configured to change the control signal such that the energization to the motor is not cut off when the motor is in the position hold state.

* * * * *